(12) United States Patent
Sun et al.

(10) Patent No.: US 11,014,680 B2
(45) Date of Patent: May 25, 2021

(54) POWER SUPPLY AND DISTRIBUTION DEVICE FOR SOLAR-POWERED AIRCRAFT

(71) Applicant: Beihang University, Beijing (CN)

(72) Inventors: Kangwen Sun, Beijing (CN); Ming Zhu, Beijing (CN); Jiaqi Dong, Beijing (CN); Haoquan Liang, Beijing (CN); Mou Sun, Beijing (CN); Lifeng Shi, Beijing (CN)

(73) Assignee: Beihang University, Beijing (CN)

( * ) Notice: Subject to any disclaimer, the term of this patent is extended or adjusted under 35 U.S.C. 154(b) by 803 days.

(21) Appl. No.: 15/871,066

(22) Filed: Jan. 15, 2018

(65) Prior Publication Data

US 2019/0100321 A1  Apr. 4, 2019

(30) Foreign Application Priority Data

Sep. 30, 2017 (CN) .......................... 201710914468.5

(51) Int. Cl.
| | |
|---|---|
| *B64D 27/02* | (2006.01) |
| *H02M 3/335* | (2006.01) |
| *H02J 7/35* | (2006.01) |
| *B64D 27/24* | (2006.01) |
| *H02J 3/38* | (2006.01) |

(Continued)

(52) U.S. Cl.
CPC .............. *B64D 27/02* (2013.01); *B64D 27/24* (2013.01); *H02J 3/381* (2013.01); *H02J 7/34* (2013.01); *H02J 7/35* (2013.01); *H02M 3/33584* (2013.01); *H02S 10/40* (2014.12); *H02S 40/30* (2014.12); *B64D 2211/00* (2013.01); *H02J 2300/24* (2020.01); *H02J 2310/44* (2020.01); *Y02T 50/50* (2013.01)

(58) Field of Classification Search
CPC .... B64D 27/02; B64D 27/24; B64D 2211/00; H02S 10/40; H02S 40/30; H02J 3/381; H02J 7/34; H02J 7/35; H02J 2300/24; H02J 2310/44; H02M 3/33584; Y02T 50/50
See application file for complete search history.

(56) References Cited

U.S. PATENT DOCUMENTS

| | | | |
|---|---|---|---|
| 8,120,308 B2* | 2/2012 | Ward | B60L 53/14 320/101 |
| 2012/0048325 A1* | 3/2012 | Matsuo | H02J 3/383 136/244 |
| 2020/0062136 A1* | 2/2020 | McCalmont | B60L 53/30 |

* cited by examiner

*Primary Examiner* — Carlos Amaya
(74) *Attorney, Agent, or Firm* — Bayramoglu Law Offices LLC

(57) ABSTRACT

A power supply and distribution device for solar-powered aircraft includes at least two power supply and distribution sub-systems having same configurations. A disconnection of an electrical connection between a plurality of components of each power supply and distribution sub-system can be controlled through a first switch. An electrical connection between the same components of the power supply and distribution sub-systems can be established by controlling a second switch. The power supply and distribution device for solar-powered aircraft has a centralized-distribution design. Specifically, each power supply and distribution sub-system is designed in a centralized mounting manner and has separated power supply and power distribution functions that can work separately. The power supply and distribution systems are designed in a distributed mounting manner which is suitable for solar aircrafts having characteristics of large wingspan and distributed propulsion system, thereby effectively reducing the concentrated stress.

7 Claims, 2 Drawing Sheets

(51) Int. Cl.
*H02J 7/34* (2006.01)
*H02S 40/30* (2014.01)
*H02S 10/40* (2014.01)

POWER SUPPLY AND DISTRIBUTION DEVICE FOR SOLAR-POWERED AIRCRAFT

CROSS REFERENCE TO RELATED APPLICATIONS

This application is based upon and claims priority to Chinese Patent Application No. 201710914468.5, filed on Sep. 30, 2017, the entire contents of which are incorporated herein by reference.

TECHNICAL FIELD

The present invention relates to the technical field of aviation aircrafts, and particularly to a power supply and distribution device for solar-powered aircrafts.

BACKGROUND

The solar-powered aircrafts are powerful, adaptable, flexible, and cost-effective. The wide use of solar-powered aircrafts is increasing. In order to improve the aerodynamic efficiency of solar-powered aircrafts, wings with a high aspect ratio and a design of distributed propulsion system are usually used, which raises new requirements for the weight distribution and long-term stable operation of the power distribution system of aircrafts. The design of the power distribution of the traditional centralized aircraft cannot meet such requirements.

SUMMARY OF THE INVENTION

The objective of the present invention is to address the drawbacks existing in the prior art and to provide a power supply and distribution device with uniform mass distribution, high power generation efficiency, small space requirement, high redundancy, and high reliability for solar-powered aircrafts.

To achieve the above-mentioned objectives, the technical solutions used by the present invention are as follows.

A power supply and distribution device for solar-powered aircraft includes at least two power supply and distribution sub-systems having same configurations. Particularly, an electrical connection between a plurality of components of each power supply and distribution sub-system can be cut off by controlling a switch, and an electrical connection between identical components of the at least two power supply and distribution sub-systems can be established by controlling a switch.

Furthermore, each power supply and distribution sub-system includes a solar cell sub-array, a unidirectional DC/DC converter, a propulsion system, a bidirectional DC/DC converter, and an energy-storing lithium battery pack. The solar cell sub-array, the unidirectional DC/DC converter, the propulsion system, the bidirectional DC/DC converter, and the energy-storing lithium battery pack are sequentially and electrically connected.

Furthermore, the power supply and distribution device for solar-powered aircraft uses a DC power supply mode including a positive pole and a negative pole. The first switch for disconnecting the electrical connection between the components inside one power supply and distribution sub-system is connected to one of the positive pole or the negative pole. The second switch for electrically connecting the same components in the at least two power supply and distribution sub-systems is connected to the other of the positive pole and the negative pole, respectively.

Furthermore, the power supply and distribution device for solar-powered aircraft further includes a key component for electrically connecting to an output end of the unidirectional DC/DC converter and/or the bidirectional DC/DC converter of each power supply and distribution sub-system.

Furthermore, the key component includes a key unidirectional DC/DC converter, a load system, and a flight control system.

Furthermore, the power supply and distribution device for solar-powered aircraft includes four power supply and distribution sub-systems distributively mounted on a wing.

Furthermore, the solar cell sub-array of each power supply and distribution sub-system is distributively mounted on an upper surface of the wing. The propulsion system is mounted at a position corresponding to the solar cell sub-array in a front side of the wing. The unidirectional DC/DC converter, the bidirectional DC/DC converter and the energy-storing lithium battery pack are centrally mounted inside the wing below the solar cell sub-array. The key unidirectional DC/DC converter is mounted inside a fuselage.

Furthermore, the solar cell sub-array of each power supply and distribution sub-system is distributively mounted on an upper surface of the wing. The propulsion system is distributively mounted at a position corresponding to the solar cell sub-array on a front side of the wing. The energy-storing lithium battery pack is distributively mounted inside the wing below the solar cell sub-array. The unidirectional DC/DC converter and the bidirectional DC/DC converter are centrally mounted inside the wing below the solar cell sub-array.

The power supply and distribution device for solar-powered aircraft uses a centralized-distribution design. Specifically, each power supply and distribution sub-system is designed in a centralized mounting manner and has separated power supply and power distribution functions that can work separately. The plurality of power supply and distribution systems are designed in a distributed mounting manner which is suitable for solar aircrafts having characteristics of large wingspan and distributed propulsion system, thereby effectively reducing the concentrated stress. Moreover, the components of the plurality of power supply and distribution systems are designed in controllably parallel connection to achieve a redundant backup, so as to realize the fault isolation function at a component level and a component backup function within the plurality of power supply and distribution sub-systems, thereby improving the operation reliability.

DETAILED DESCRIPTION OF THE INVENTION

The specific implementations of a power supply and distribution device for solar-powered aircraft according to the present invention are further described with reference to the embodiments hereinafter. The power supply and distribution device for solar-powered aircraft of the present invention is not limited to the description of the following embodiments.

Embodiment 1

Figure 1:
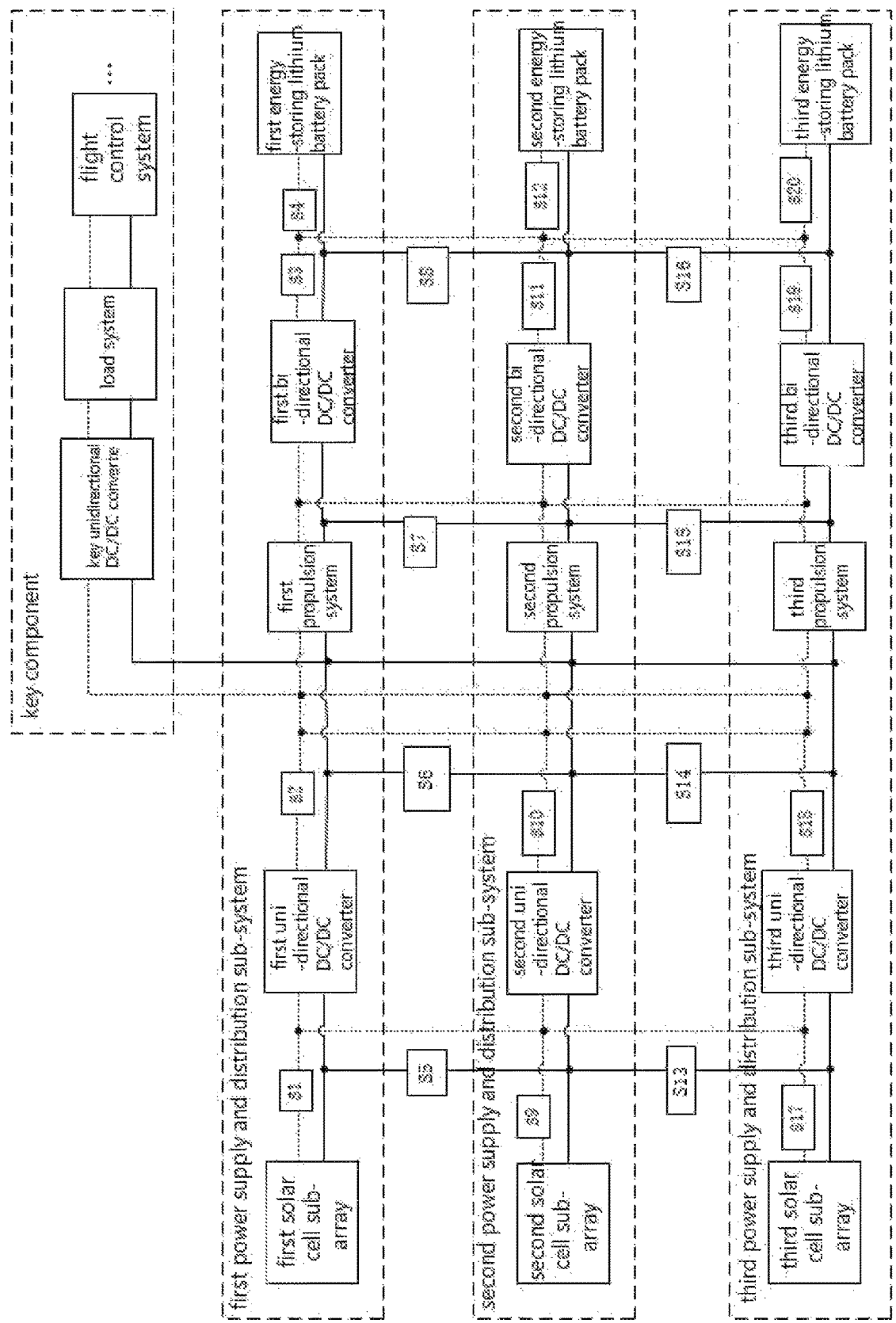
FIG. 1 is a functional-structural schematic diagram of a power supply and distribution device for solar-powered aircraft according to the present invention.

The overall functional-structural schematic diagram of the power supply and distribution device for solar-powered aircraft of the present invention is shown in FIG. 1, which includes three (the number also may be two or more) power supply and distribution sub-systems having the same configurations. Each power supply and distribution sub-system includes a solar cell sub-array, a unidirectional DC/DC converter, a propulsion system, a bidirectional DC/DC converter and an energy-storing lithium battery pack, wherein the solar cell sub-array, the unidirectional DC/DC converter, the propulsion system, the bidirectional DC/DC converter and the energy-storing lithium battery pack are sequentially and electrically connected. The power supply and distribution device for solar-powered aircraft uses a DC power supply mode. The components are electrically connected through two conductive lines (positive and the negative). Now, assuming that the solid lines in the drawings refer to the positive conductive lines, and the broken lines refer to the negative conductive lines.

Control switches (S1-S4, S9-S12, S17-S20) are arranged between a plurality of components of each power supply and distribution sub-system to disconnect the electrical connections between the components. These switches are arranged on the negative conductive lines (broken lines). Meanwhile, control switches are also arranged between the same components in the plurality of power supply and distribution sub-systems to achieve electrical connections within the same components. These switches are arranged on the positive conductive lines (solid lines). By doing so, the advantages of the simplified circuit and easier logic control of multiple switches can be achieved.

Each power supply and distribution sub-system drives its own propulsion system to operate while supplying power to the key parts of the aircraft such as the load system and flight control system etc. through the unidirectional DC/DC converter, where the voltage is converted, filtered and rectified. During sufficient sunlight, the output power of the solar cell sub-array is sufficient. The propulsion system and the key component are driven to operate by the energy provided by output of the solar cell sub-array through the unidirectional DC/DC converter. Also, the energy-storing lithium battery pack is charged by the energy provided by the solar cell sub-array through the bidirectional DC/DC converter. During insufficient sunlight, the propulsion system and the key component are driven to operate by the energy provided by the energy-storing lithium battery pack through the bidirectional DC/DC converter.

The control switch uses a relay structure which is logically controlled through control units to realize the functions such as setting the operating state of the system, isolating the faulty components, reconstructing the power supply and distribution functions of the system, etc., so as to ensure that the power supply and distribution device of the solar-powered aircraft always works in a proper state. For the specific control logic, please see embodiment 3.

Embodiment 2

Figure 2:
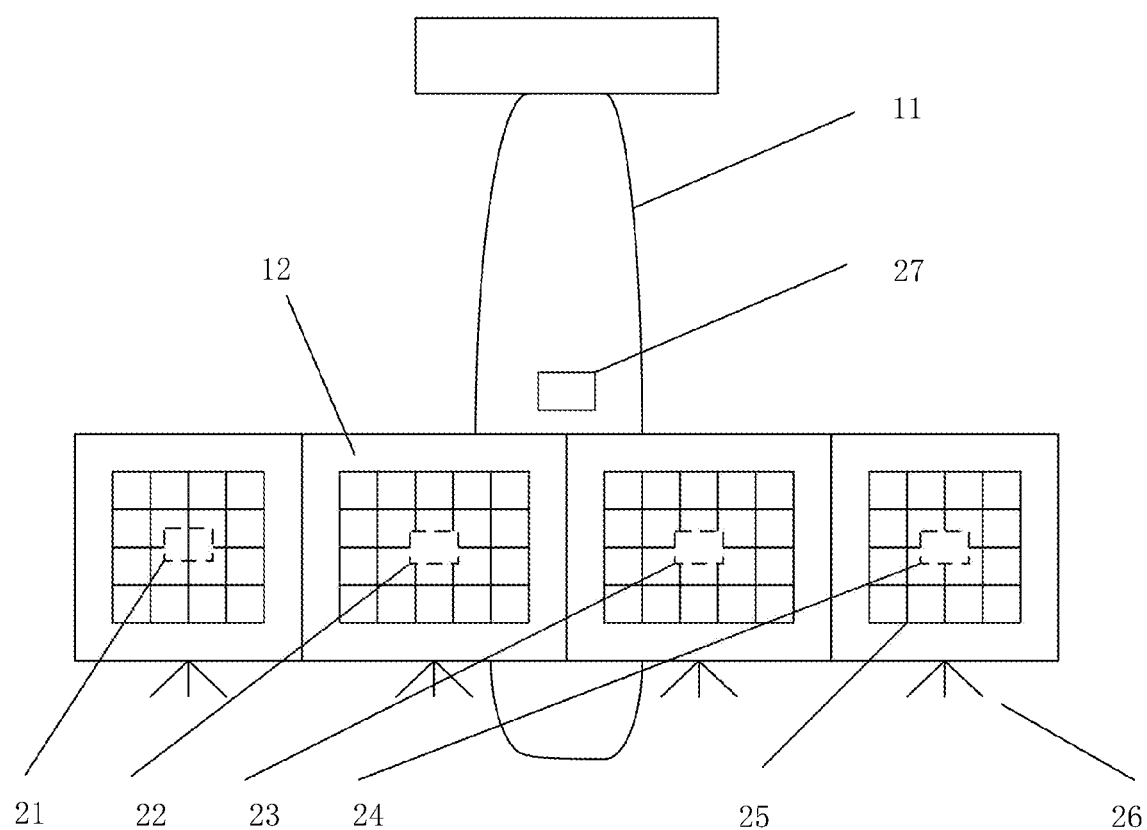
FIG. 2 is a structural schematic diagram of the mounting of the power supply and distribution device for solar-powered aircraft according to the present invention.
Figure 3:
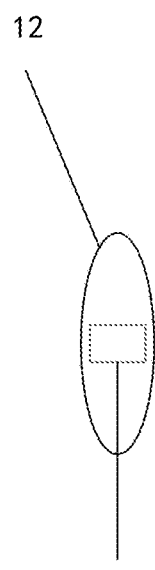
FIG. 3 is a side cross-sectional view of the wing assembly of FIG. 2.

FIG. 2 and FIG. 3 show the structural schematic diagrams of the power supply and distribution device for solar-powered aircraft which is mounted on an aircraft in a centralized-distribution manner. The aircraft includes fuselage 11 and wing 12. Four power supply and distribution sub-systems (21, 22, 23, 24) having the same configurations are distributively mounted on the wings. Specifically, solar cell sub-array 25 of each power supply and distribution sub-system is mounted on an upper surface of the wings. The propulsion system 26 is mounted at a position corresponding to the solar cell sub-array 25 on a front side of the wing. The unidirectional DC/DC converter, the bidirectional DC/DC converter, and the energy-storing lithium battery pack etc. of each power supply and distribution sub-system are centrally mounted inside a separate equipment room 28 in the wing below the solar array sub-array. The key unidirectional DC/DC converter of the key component is mounted inside key equipment room 27 in the fuselage.

Embodiment 3

Another structural schematic diagram of the power supply and distribution device for solar-powered aircraft which is mounted on an aircraft in a centralized-distribution manner is described in this embodiment.

The structure of embodiment 3 is similar to that of embodiment 2, except that the unidirectional DC/DC converters and the bidirectional DC/DC converters of four power supply and distribution sub-systems are mounted inside the plurality of separate equipment rooms 28 in the wing 12, and the energy-storing lithium battery pack is arranged by a distributed structure which is divided into a plurality of modules to be mounted below each solar cell module, correspondingly. By doing so, the mass is distributively arranged.

Embodiment 4

The present embodiment shows the logic control manner of the plurality of switches of the power supply and distribution device for solar-powered aircraft described in the first embodiment. Since the plurality of power supply and distribution sub-systems have the same configuration and principle, merely the first power supply and distribution sub-system and the second power supply and distribution sub-system shown in FIG. 1 are illustrated as examples.

1. Normal Operation Mode

As shown in FIG. 1, when each of the components is in normal mode, the switches S1-S4 and S9-S12 are in a closed state and the switches S5-S8 are in an open state. Namely, the components of the first supply and distribution sub-system and the second supply and distribution sub-system work normally and separately. The solar cell sub-array of each power supply and distribution sub-system supplies power to the propulsion system through a unidirectional DC/DC converter, and is connected to the energy-storing lithium battery pack through a bidirectional DC/DC converter. At this time, the operation mode of the device is as follows.

(1) When there is sufficient sunlight in the daytime, and the energy-storing lithium battery pack is not fully charged, the operation mode is MPPT mode. After the energy-storing lithium battery pack is fully charged, the unidirectional DC/DC converter works in a constant-voltage mode to maintain the stability of the bus voltage. The bidirectional DC/DC converter works in a charging mode. In addition, the charging current of the lithium battery can be changed by setting the target current of the Buck control circuit, so as to protect the lithium battery while the current solar energy is mostly utilized. If the energy-storing lithium battery pack is fully charged, the bidirectional DC/DC converter does not work, and the system is merely supplied by the solar energy.

(2) If there is insufficient sunlight, or the load suddenly increases, the unidirectional DC/DC converter switches to a MPPT mode, and the bidirectional DC/DC converter works in a discharging mode. The bus voltage is maintained by the bidirectional converter control circuit. Namely, the solar energy and energy-storing lithium battery pack supply power together to maintain the normal work of the system.

(3) During nighttime, the unidirectional DC/DC converter does not work, and the energy-storing lithium battery pack supplies power. The bidirectional DC/DC converter works in the discharging mode to maintain the stability of the bus voltage.

2. Failure Operation Mode

When a component fails, the operation mode of the device is as follows.

1) Failure of the Solar Cell Sub-Array

Taking a situation where the first solar cell sub-array fails and the second solar cell sub-array is used as a backup as an example, in this case, switch S1 will be turned off by the control circuit based on the switching sequence of the normal operation mode to isolate the first solar cell sub-array and switch S5 will be turned on to allow the device to operate normally by reducing the load. Typical solar cell failure is the damage of the power supply lines.

(2) Failure of the Unidirectional DC/DC Converter

If certain unidirectional DC/DC converter fails, the failed component needs to be isolated and the system should be reconstructed to maintain the proper functioning of the energy system. Taking a situation where the first solar cell sub-array fails and the second solar cell sub-array is used as a backup as an example, in this case, switch S2 will be turned off by the control circuit based on the switching sequence of the normal operation mode to isolate the failed component and switches S5 and S6 will be turned on so that the output end of the first solar cell sub-array and the output end of the second solar cell sub-array are connected in parallel, and the power conversion is realized by the second unidirectional DC/DC converter. Typical failures of the unidirectional DC/DC converter failure are that there is no output or the output is uncontrollable.

(3) Failure of the Bidirectional DC/DC Converter

If certain bidirectional DC/DC converter fails, the above-mentioned idea is also used to achieve fault isolation and functional reconstruction of the system. Taking a situation where the first solar cell sub-array fails and the second solar cell sub-array is used as a backup as an example, in this case, switch S3 will be turned off based on the switching sequence of the normal operation mode to isolate the failed component, and switches S7 and S8 will be turned on, so that the first energy-storing lithium battery pack and the second energy-storing lithium battery pack are connected in parallel, and the power conversion is realized by the second bi-directional DC/DC converter. A typical failure of the bidirectional DC/DC converter is that there is no output, or the input and output are uncontrollable.

(4) Failure of the Energy-Storing Lithium Battery Pack

Taking a situation where the first energy-storing lithium battery pack fails and the second energy-storing lithium battery pack is used as a backup as an example, in this case, the switch S4 needs to be turned off based on the switching sequence of the normal operation mode to isolate the failed component, and switch S8 will be turned on to make the first bidirectional DC/DC converter connect to the second bidirectional DC/DC converter in parallel and then connect to the second energy-storing lithium battery pack.

The foregoing is a detailed description of the present invention with reference to specific preferred embodiments, so the specific implementation of the present invention should not be considered to be limited to these descriptions. The derivations and substitutions made by those of ordinary skill in the art without departing from the concept of the present invention should be considered to fall within the scope of the present invention.

What is claimed is:

1. A power supply and distribution device for solar-powered aircraft, comprising:
    at least two power supply and distribution sub-systems having a same configuration;
    wherein
    an electrical connection between a plurality of components of each power supply and distribution sub-system can be disconnected by controlling a first switch; and
    an electrical connection between identical components of the at least two power supply and distribution sub-systems can be established by controlling a second switch, and
    wherein
    the plurality of components of each power supply and distribution sub-system comprises a solar cell sub-array, a unidirectional DC/DC converter, a propulsion system, a bidirectional DC/DC converter, and an energy-storing lithium battery pack; and
    the solar cell sub-array, the unidirectional DC/DC converter, the propulsion system, the bidirectional DC/DC converter, and the energy-storing lithium battery pack are sequentially and electrically connected.

2. The power supply and distribution device for solar-powered aircraft of claim 1, wherein
    the power supply and distribution device for solar-powered aircraft has a DC power supply mode including a positive pole and a negative pole;
    the first switch for disconnecting the electrical connection between the plurality of components of one power supply and distribution sub-system is connected to one of the positive pole or the negative pole; and
    the second switch for electrically connecting the identical components in the at least two power supply and distribution sub-systems is connected to the other of the positive pole or the negative pole.

3. The power supply and distribution device for solar-powered aircraft of claim 2, wherein
    the power supply and distribution device for solar-powered aircraft further comprises a key component for electrically connecting to an output end of the unidirectional DC/DC converter and/or the bidirectional DC/DC converter of each power supply and distribution sub-system.

4. The power supply and distribution device for solar-powered aircraft of claim 3, wherein
    the key component comprises a key unidirectional DC/DC converter, a load system, and a flight control system.

5. The power supply and distribution device for solar-powered aircraft of claim 1, wherein
    the power supply and distribution device for solar-powered aircraft comprises four power supply and distribution sub-systems distributively mounted on a wing.

6. The power supply and distribution device for solar-powered aircraft of claim 5, wherein
    the solar cell sub-array of each power supply and distribution sub-system is distributively mounted on an upper surface of the wing;

the propulsion system is mounted at a position corresponding to the solar cell sub-array in a front side of the wing;

the unidirectional DC/DC converter, the bidirectional DC/DC converter, and the energy-storing lithium battery pack are centrally mounted inside the wing below the solar cell sub-array.

7. The power supply and distribution device for solar-powered aircraft of claim 5, wherein the solar cell sub-array of each power supply and distribution sub-system is distributively mounted on an upper surface of the wing;

the propulsion system is distributively mounted at a position corresponding to the solar cell sub-array in a front side of the wing;

the energy-storing lithium battery pack is distributively mounted inside the wing below the solar cell sub-array; and the unidirectional DC/DC converter and the bidirectional DC/DC converter are centrally mounted inside the wing.

\* \* \* \* \*